US008211531B2

(12) United States Patent
Schmid et al.

(10) Patent No.: US 8,211,531 B2

(45) Date of Patent: Jul. 3, 2012

(54) SECURITY ELEMENT HAVING A VIEWING-ANGEL DEPENDENT ASPECT

(75) Inventors: Mathieu Schmid, Lausanne (CH); Claude-Alain Despland, Prilly (CH); Pierre Degott, Crissier (CH); Edgar Mueller, Lausanne (CH)

(73) Assignee: SICPA Holding SA, Prilly (CH)

( * ) Notice: Subject to any disclaimer, the term of this patent is extended or adjusted under 35 U.S.C. 154(b) by 1230 days.

(21) Appl. No.: 11/721,078

(22) PCT Filed: Nov. 10, 2005

(86) PCT No.: PCT/EP2005/055884

§ 371 (c)(1), (2), (4) Date: Jun. 7, 2007

(87) PCT Pub. No.: WO2006/061301

PCT Pub. Date: Jun. 15, 2006

(65) Prior Publication Data

US 2009/0230670 A1 Sep. 17, 2009

(30) Foreign Application Priority Data

Dec. 9, 2004 (EP) .................................... 04029170

(51) Int. Cl.
*B32B 5/16* (2006.01)

(52) U.S. Cl. ........ 428/203; 428/206; 428/207; 428/403; 428/916; 427/458; 427/550; 427/560; 283/94; 283/110

(58) Field of Classification Search .................. 428/204, 428/403, 404, 203, 207, 208, 916, 206; 427/458, 427/550, 560; 283/94, 110
See application file for complete search history.

(56) References Cited

U.S. PATENT DOCUMENTS

| | | | | |
|---|---|---|---|---|
| 3,676,273 | A | | 7/1972 | Graves |
| 3,791,864 | A | | 2/1974 | Steingroever |
| 4,434,010 | A | | 2/1984 | Ash |
| 4,597,793 | A | | 7/1986 | Amon et al. |
| 4,599,111 | A | | 7/1986 | Amon et al. |
| 4,838,648 | A | * | 6/1989 | Phillips et al. ................ 359/585 |
| 5,084,351 | A | | 1/1992 | Philips et al. |
| 5,171,363 | A | * | 12/1992 | Phillips et al. ............. 106/31.65 |
| 5,310,222 | A | * | 5/1994 | Chatwin et al. ................. 283/86 |
| 5,364,689 | A | * | 11/1994 | Kashiwagi et al. ........ 428/195.1 |

(Continued)

FOREIGN PATENT DOCUMENTS

CA 2161816 5/1996

(Continued)

OTHER PUBLICATIONS

Rudolf L. van Renesse, Optical Document Security, 2nd Edition, 1998, Chapters 10, pp. 225-247, Chapters 13 and 14. pp. 289-347.

(Continued)

*Primary Examiner* — Gerard Higgins

(74) *Attorney, Agent, or Firm* — Greenblum & Bernstein, PLC

(57) ABSTRACT

The invention discloses a security element having a coating layer which appears transparent at certain angles of view, giving visual access to underlying information, whilst staying opaque at other angles of view. Documents of value, right, identity, security labels or branded goods comprising said security element, as well as a method for producing said security element, are also disclosed. Using appropriate substrate surfaces, optically variable and otherwise angle-dependent visual effects can be realized.

12 Claims, 7 Drawing Sheets

U.S. PATENT DOCUMENTS

| | | | | |
|---|---|---|---|---|
| 5,424,119 | A | 6/1995 | Phillips et al. | |
| 5,630,869 | A | 5/1997 | Amon et al. | |
| 6,902,807 | B1 | 6/2005 | Argoitia et al. | |
| 7,300,695 | B2 | 11/2007 | Argoitia et al. | |
| 7,674,501 | B2 | 3/2010 | Raksha et al. | |
| 7,691,468 | B2 | 4/2010 | Benninger et al. | |
| 8,025,952 | B2 | 9/2011 | Raksha et al. | |
| 2002/0182383 | A1* | 12/2002 | Phillips et al. | 428/199 |
| 2003/0062421 | A1* | 4/2003 | Bloomberg et al. | 235/494 |
| 2003/0104206 | A1 | 6/2003 | Argoitia et al. | |
| 2003/0188842 | A1 | 10/2003 | Ronnenberg | |
| 2004/0051297 | A1* | 3/2004 | Raksha et al. | 283/57 |
| 2005/0067497 | A1* | 3/2005 | Jones et al. | 235/492 |

FOREIGN PATENT DOCUMENTS

| | | |
|---|---|---|
| EP | 0 088 466 | 4/1986 |
| EP | 0 119 958 | 5/1989 |
| EP | 0 227 423 | 6/1992 |
| EP | 0 340 163 | 12/1992 |
| EP | 0 227 424 | 7/1993 |
| EP | 0556449 | 8/1993 |
| EP | 0 327 788 | 11/1993 |
| EP | 0 406 667 | 1/1995 |
| EP | 0 432 093 | 9/1995 |
| EP | 0 710 508 | 5/1996 |
| JP | 06-297890 | 10/1994 |
| JP | 2003-300373 | 10/2003 |
| JP | 2004-195691 | 7/2004 |
| WO | 02/073520 | 9/2002 |
| WO | 02/090002 | 11/2002 |
| WO | 2004/007095 | 1/2004 |
| WO | 2005/002866 | 1/2005 |

OTHER PUBLICATIONS

Japanese Office Action in counterpart Japanese Application dated Nov. 29, 2011.

* cited by examiner

SECURITY ELEMENT HAVING A VIEWING-ANGEL DEPENDENT ASPECT

The present invention is in the field of security documents, more particularly in the field of security elements aimed to protect security documents against copying (illegal reproduction) and counterfeiting. It discloses a security element having a coating layer which appears transparent at certain angles of view, giving visual access to underlying information, whilst staying opaque at other angles of view. Security documents comprising said security element, as well as a method for producing said security element, are also disclosed. Combined with appropriate substrate surfaces, optically variable and other angle-dependent visual effects can be realized.

Coatings, printings and markings exhibiting a viewing-angle-dependant visual appearance ("optically variable devices", OVDs) are used as efficient anti-copy means on bank notes and security documents (cf. "Optical Document Security", ed. R. L. van Renesse; 2$^{nd}$ edition, 1998, Artech House, London). Among the OVDs, optically variable ink (OVI®, EP-A-0 227 424) holds a preeminent position as an "overt" security element, since its first use on a banknote back in 1987. Optically variable inks are formulated on the base of optically variable pigments (OVPs), preferably flakes of the thin-film optical interference device disclosed in U.S. Pat. Nos. 4,434,010; 5,084,351; 5,171,363; EP-A-0 227 423 and in related documents.

Printed optically variable elements on security documents are primarily used for the "overt" authentication of security documents by the unaided human eye, through the user's checking of said element's spectral reflection properties, i.e. its color at two or more different angles of view, at least at near-orthogonal and at near grazing view with respect to the plane of the document. Said angle-dependent color is a "simple message of authenticity", which cannot be reproduced without having access to the source of the genuine optically variable security element, and which can easily be checked by the "man on the street".

The increasing commercial availability of non-security color-shifting pigments, mainly for decorative applications, calls for the development of upgraded "overt" security elements, for use on "next generation" banknotes and on other protected documents. Such upgraded security element must comply, among others, with the following requirements: i) it should carry a "simple message of authenticity" which can be rapidly and easily identified by the "man on the street"; ii) it should not be reproducible without having access to the genuine particular security material and/or to the required particular production or security printing technology; iii) it should not be under commercial pressure from the decorative market or from another large industrial application field.

In U.S. Pat. Nos. 3,676,273; 3,791,864; EP-B-0 406 667; EP-B-0 556 449 B1; EP-A-0 710 508 and WO 02/90002, as well as in the co-pending application PCT/EP2004/007028, methods and devices are disclosed, which can be used to impart a particular orientation to magnetic optically variable pigment flakes in a freshly printed optically variable coating composition, prior to the drying (hardening) of the said composition. In such a way, magnetically induced patterns which are highly resistant to counterfeit can be produced. The security element in question can only be produced by having access to both, the source of the optically variable magnetic pigment or the corresponding ink, and the particular technology employed to print said ink and to orient said pigment in the printed ink. On the other hand, the visual pattern resulting from said magnetic orientation of optically variable pigment in a printed ink is easily recognized and identified by the 'man on the street'.

The present invention discloses a different solution to the stated technical problem of providing upgraded "overt" copy-protection security elements for the next generation of banknotes and other protected documents. The security element for documents of value, of rights, of identity, security labels, or branded goods, according to the present invention, comprises a substrate containing indicia or other visible features in or on its surface, and, on at least part of the said substrate surface, a coating layer comprising pigment flakes in a cured, transparent binder, wherein the said pigment flakes in said coating layer are absorbing in at least part of the visible spectrum, and are locally oriented such that the coating layer shows local, angle-dependent variations of its transparency, i.e. that it gives visibility to the underlying indicia or other visible features along at least one specific direction of observation, and impedes visibility to the underlying indicia or other visible features along at least another direction of observation. The orientation of the pigment flakes in said cured, transparent binder does, however, not itself comprise or reflect said indicia or other visible features which are present in or on the surface of said substrate.

In the context of the present invention, "transparent" is used in the sense of "allowing the human eye to see through, at least in some part of the visible spectrum", and the term "angle-dependent variations of its transparency" is to be understood in the sense that the coating layer, when viewed under a first angle, allows the perception of the underlying indicia or other visible features. When viewed under some other angle, different from the said first angle, said coating layer hides the said underlying indicia or other visible features.

The described visual phenomena are achieved, according to the present invention, through a "Venetian Blind effect", which is produced by correspondingly oriented pigment flakes comprised in the said coating layer.

Said pigment flakes are noteworthy locally oriented such that, along a specific direction of observation, they give visibility to the underlying substrate surface, such that the indicia or other features present on or in the said substrate surface become apparent to the observer. Said direction of observation is hereby defined by the planes of the oriented pigment flakes, i.e. the pigment flakes are locally oriented such that their planes contain at least one common vector, which corresponds to the said direction of observation. Said planes of said flakes may further be oriented all in parallel, or, alternatively, a second vector of said planes may have a random orientation whilst a first vector of said planes corresponds to the said common direction of observation which allows to see through the "Venetian Blind" coating layer.

When looking along a direction which is substantially different from said direction common to all planes of the locally oriented pigment flakes, the visibility to the underlying substrate surface and to the indicia or other features on or in it is screened by the pigment flakes, which act towards the observer in the manner of a Venetian Blind. This screening mechanism can be used to produce a large variety of optically variable effects, such as the angle-dependent appearance of indicia in color, luminescence, etc., depending on the features present on or in the underlying substrate surface, on the precise orientation of the pigment flakes, as well as the physical properties of the flake pigment itself and of the coating composition containing it.

In particular, the pigment flakes need not to be oriented vertically to produce the said Venetian blind effect; in fact, any orientation of the pigment flakes which is substantially different from an alignment with the plane of the substrate surface will exhibit the Venetian Blind effect. A viewing direction chosen close to grazing angle, however, has the disadvantage of a large perspective-distortion; i.e. under such angle, the indicia or features on or in the substrate surface are only perceived with difficulty. For this reason, the oriented pigment flake planes are chosen to preferably have an elevation angle (=viewing direction) of at least 30° with respect to the plane of the substrate surface.

The orientation of the pigment flakes in said coating layer does not comprise or reflect said indicia or other visible features which are present in or on the surface of said substrate. The provision of those indicia or features is carried out independently from said coating layer. The idea of the present invention is to use said coating layer for providing an angle-dependent visibility of said indicia or features, not to use said coating layer for generating said indicia or features. The particles in said coating layer are oriented independently from said indicia or features, i.e. the latter are not used as a pattern for orientation.

To produce the said Venetian Blind effect, the pigment particles must have a "flake shape", i.e. their thickness must be small compared to their length and width, such as e.g. is the case for the pigment particles disclosed in EP-A-0 227 423, the respective content thereof being incorporated herein by reference. Said particles have typical dimensions of 1 μm thickness by 10 to 30 μm length and width. Particles displaying such type of geometry are suited to embody the Venetian Blind effect of the present invention, if their orientation in the printed ink is appropriately controlled.

The security element of the present invention, displaying a Venetian Blind effect is preferably produced by first providing a substrate with a desired surface of determined size, which contains indicia or other appropriate perceptible features on or in its surface. Said indicia or other perceptible features may be produced by a previous coating, printing, laser-marking, or other suitable treatment of the substrate. Said substrate surface is then coated at least in part with a composition containing flake pigment particles and a curable, transparent binder. After said coating, said flake pigment particles are locally oriented by an appropriate method and means, and finally, the composition is cured, in order to fix the pigment flakes in their oriented positions.

A large variety of optical effects can be produced by appropriate combinations of substrate surfaces containing indicia or other visible features, on the one hand, and overprinted areas of locally oriented flake pigment exhibiting "Venetian blind" effects, on the other hand, as illustrated in FIGS. 1A-G, which schematically show cross sections through different embodiments of the security element according to the present invention:

In FIG. 1A, a substrate (1) carries printed indicia (2) on part of its surface, which are overprinted with an ink containing a flake pigment (3). All the pigment particles (3) in the printed ink are oriented and fixed, such as to adopt a same oblique position, pointing about 45° to the right. The printed indicia (2) can be seen when viewed at a 45° angle from the right (i.e. when looking in parallel to the alignment axes of the pigments (3)); but not at all when viewed from the left.

In FIG. 1B, a similar arrangement as in FIG. 1A is shown except that the flake pigment particles (3) are now oriented and fixed pointing about 45° to the left. Accordingly, the indicia can be seen when viewed from the left; but not when viewed from the right.

In FIG. 1C, a similar arrangement as in FIG. 1A is shown, except that the flake pigment particles (3) are locally oriented and fixed selectively along two different directions; noteworthy about 45° to the left in zone A, and about 45° to the right in zone B. Indicia in zone A can be seen when viewed from the left, indicia in zone B cannot. Indicia in zone B can be seen when viewed from the right, indicia in zone A cannot.

In FIG. 1D, a similar arrangement as in FIG. 1C is shown except having the orientation of the flake pigment particles (3) in zone A and zone B reversed. Indicia in zone A can be seen from the right, indicia in zone B cannot. Indicia in zone B can be seen from the left, indicia in zone A cannot.

In FIG. 1E, a homogeneously colored surface (2) on a substrate (1) is overprinted with an ink containing flake pigment (3) of the said type. The pigment particles (3) are oriented and fixed according to two different directions in areas A and B, respectively. The colored substrate surface (2) appears differently in areas A and B, depending on the viewing angle, and exhibits a "flip-flop" effect upon tilting the substrate forth and back between areas A and B.

In FIG. 1F, the contrast between areas A and B is further enhanced, compared to FIG. 1E, through an imprinting of the substrate surface (2) itself with an iridescent or optically variable ink. In particular, using differently oriented and fixed flake pigment particles (3) in areas A and B, respectively, printed on top of said iridescent substrate surface (2), area A can be made to appear lighter when observed from the left, and darker when observed from the right, than it would be the case of a substrate surface (2) imprinted with purely absorbing inks.

In FIG. 1G, a fluorescent material (2) comprised in or on a substrate (1) is provided with angle-dependent properties by overprinting it with an ink containing oriented and fixed flake pigment particles (3). To observe the fluorescence in this embodiment, both, the excitation (e.g. by a UV source) and the observation (e.g. by eye) must take place at the same oblique angle, i.e. 45° from the right for zone A, and 45° from the left for zone B, respectively. Using excitation from the left and observation from the right, or vice-versa, will not show any luminescence.

The security element of the present invention is thus characterized by a combination of a substrate surface carrying indicia or other visible features, and a coating containing flake pigment, applied on top of at least part of said substrate surface, wherein said pigment flakes are oriented such as to allow visibility of the said indicia or other features along at least one direction of observation, and to impede visibility of the said indicia or other features along at least another direction of observation.

The concentration of the flake particles in the ink is chosen such that, at maximum, about full (i.e. at least 90%) surface coverage would be obtained in the printed ink if the flake particles were to align, after printing, with their large surfaces parallel to the imprinted substrate surface. In the case of the preferred flake pigments of EP-A-0 227 423, such concentration is in the range of 10 to 30% by weight of the coating composition. In any particular case, the optimum concentration of the flake pigment must be determined experimentally, as a function of the pigment properties (particle size, specific weight, etc.), the thickness of the coating, the orientation angle, and the nature of the substrate, in order to yield the best visual effect.

In general, the skilled in the art will choose the flake concentration on one hand as low as possible, in order to achieve good visibility to the substrate surface along a predefined viewing direction, and, on the other hand, sufficiently high, such as to give good screening of the substrate surface along some other direction. In particular, if the coating layer is rather thick and the pigment flakes are oriented nearly vertically, then the pigment concentration required to hide the substrate surface when the print is observed near grazing angle turns out to be considerably less than what would be required in the case of horizontally aligned pigment flakes to cover about the full surface.

The upper limit of the useful pigment concentration is thus the one which would provide, at a given coating thickness and horizontal alignment of the pigment flakes, for substantially complete (i.e. more than 90%) surface coverage, whereas the lower useful pigment concentration is about half of the concentration which would provide for substantially complete surface coverage.

As already stated, the mean particle size and the size distribution in a particular pigment lot have an influence on the achievable result. A rather large particle size (flake diameter in the range of 10 to 50 μm), and a size distribution which is as homogeneous as possible, are desirable, in order to yield the optimum effect. The presence of a substantial fraction of small particles in a pigment lot, on the other hand, adversely influences the "Venetian Blind" effect.

According to the present invention, as stated above, any flake pigment can be used, provided that it is of appropriate mechanical rigidity to act as lamellae and thus to produce the Venetian Blind effect. Moreover, as evident to the skilled man, the flake pigment particles must be opaque, or, at least semi-opaque (semi-transparent), in order to be able to act as screening lamellae. Semi-opaque (semi-transparent) in the context of the present disclosure means that the flake is absorbing in at least part of the visible spectrum. According to a preferred embodiment, the flake pigment is totally opaque to visible light.

Said flake pigment can in particular be chosen from the group consisting of: non-metallic inorganic flakes, metallic inorganic flakes, and organic flakes. Said flake pigment can further carry a thin-film interference coating, or a holographic embossing. Still further, said flake pigment can be a liquid crystal polymer flake, or a magnetic pigment flake, or combine both said properties, i.e. be a magnetic liquid crystal polymer flake. Moreover, said flake pigment can have further additional properties, such as luminescence, electric conduction and/or particular spectral absorption or reflection characteristics.

According to the present invention, optically variable pigments (OVPs), preferably flakes of the thin-film optical interference device disclosed in U.S. Pat. Nos. 4,434,010; 5,084,351; 5,171,363; EP-A-0 227 423 and in related documents, the respective content thereof being incorporated herein by reference, are useful. It is particularly preferred that the pigment particle to be used is an optically variable flake having magnetic properties, such as disclosed in U.S. Pat. No. 4,838,648 or in WO 02/073250, the respective content thereof being incorporated herein by reference.

Curable, transparent binder compositions which can be pigmented with flake particles, to yield inks suitable for realizing the herein disclosed "Venetian Blind" coating on a substrate surface carrying indicia or other features, are disclosed in the art, e.g. in U.S. Pat. Nos. 4,434,010; 5,084,351; 5,171,363; EP-A-0 227 423 and related documents, the respective content thereof being incorporated herein by reference. Suitable binder chemistries can be chosen e.g. from the group of vinylic resins, acrylic resins, urethan-alkyde resins, etc., and from mixtures thereof and with other polymers, and the composition can furthermore be either solvent-based or water-based.

The ink comprising the flake pigment particles is preferably applied on a prepared substrate surface via a liquid-ink printing technique, such as screen-printing or gravure/flexographic printing. The final thickness of the applied and hardened ink layer is preferably of the order of 10 to 50 μm, in order to allow for an easy orientation of the pigment flakes in all directions; however, at the price of a higher surface roughness, pigment orientation is feasible at ink layer thickness of as low as 5 μm. It is noteworthy possible to orient pigment flakes in a binder having a thickness which is much less than the diameter of the pigment flake.

In the applied coating layer, the flake pigment particles are oriented and subsequently fixed in their oriented positions through the curing of the binder. A rapidly curing ink formulation is therefore required, and UV- or EB (electron beam)-curing inks are preferred. Ink formulations for physical drying through solvent evaporation or coalescence are less favorable, although they can also find application in particular contexts (see examples). Oxy-polymerization drying, on the other hand, is too slow to be useful in such context; it could however serve as an additional drying mechanism in a rapid curing (UV, EB, heatset, coldset, etc.) ink, in order to enhance the binder's long-term resistance.

According to a preferred embodiment, a magnetic or magnetizable flake pigment is incorporated into the printing ink. The flake pigment particles can be oriented by magnetic means, i.e. by applying magnetic fields to the freshly printed document in order to locally align the magnetic flake pigment along determined directions or planes. Methods and means for orienting magnetic pigment particles in a printed ink have been disclosed in the art, for example in U.S. Pat. Nos. 3,676,273; 3,791,864; EP-B-0406 667; EP-B-0 556 449; EP-A-0 710 508 and WO 02/90002, as well as in the co-pending application PCT/EP2004/007028, the respective contents thereof being incorporated herein by reference.

To achieve magnetic orientation of the pigment flakes, a first surface of the substrate is coated or imprinted with a composition containing said magnetic pigment flakes in a binder. While the coating composition is still wet, i.e. the said binder is not hardened, the substrate, preferably a second surface of it, opposite to the said first surface, is exposed face-to-face to the magnetic field of a magnetic or magnetizable body, such as a permanent magnet, an arrangement of permanent magnets, an engraved permanent magnetic plate, or an arrangement of electromagnets. The pigment flakes in the coating composition orient themselves along the lines of the applied magnetic field, and their planes thus adopt a desired local direction in space. The coating composition is subsequently hardened, through UV-curing, physical drying by solvent evaporation, etc., thus fixing the oriented pigment particles in their adopted directions.

A non-magnetic flake pigment can also be mixed with a magnetic non-flake pigment; in the latter case, said magnetic pigment is preferably of very small particle size (<1 μm), and if possible, of acicular morphology.

Non-magnetic means of orientation can, however, also be employed in conjunction with the appropriate pigments, such as orientation by electrostatic or electrophoretic means (using an electric field), or also by ultrasonic means (using an acoustic field), such as disclosed in US-A-2003/0188842, the respective content thereof being incorporated herein by reference. The principle of orientation is the same as described above for magnetic orientation, i.e. the pigment flakes are provided in a coating composition and, before curing of said coating composition, are subjected to the respective external force. Thereafter, the thus achieved orientation is fixed by curing the coating composition.

In particular, if electrostatic or electrophoretic orientation is used, magnetic properties of the flake are not required; any difference in the dielectric constant of the flake pigment particle with respect to the surrounding ink medium will provide for the necessary orienting forces. Also in the orientation by an ultrasonic field, magnetic properties of the flake are not required; the orienting forces are in this case provided by a difference in mechanical properties of the flake pigment particle (rigidity) with respect to the surrounding liquid ink medium.

The applied, oriented and fixed ink layer is characterized by its angle-dependent transparency variations. Using appropriate substrate surfaces carrying indicia or other visible features, said transparency variations allow for the production of a large gamut of overt printed security elements which are characterized by their angle-dependent appearance/disappearance of visible features comprised in or on the substrate underneath the oriented "Venetian Blind" ink layer, as well as of features comprised in the said oriented ink layer itself.

According to the present invention, any substrate commonly used for producing security documents or documents of value can be employed. Suitable substrate materials include, but are not limited to: paper, cardboard, textiles, as well as plastic materials such as polypropylene or Tyvek® substrates. The "Venetian Blind" security feature can be directly produced on or in the substrate, or, alternatively and preferred, the latter is made to carry, on at least part of its surface, previously applied indicia, e.g. in the form of a coating, printing or marking, which may be produced according to any method known to the skilled in the art of printing and coating.

Said substrate is preferably selected from the group consisting of transparent substrates carrying printed, coated, or laser-marked indicia, and opaque substrates carrying printed, coated, or laser-marked indicia. It is also possible to provide two or more separate coatings on said surface of said substrate.

Said substrate surface may further comprise a marker substance chosen from the group of: visible luminescent substances, infrared luminescent substances, infrared absorbing substances, and magnetic substances, the effect of which can be modulated by the local orientation of the overlaid flake pigment particles.

Said substrate surface may further be or comprise an optical interference device, of the iridescent, diffraction grating (holographic), or thin-film interference layer type. Such interference devices are known to the skilled man, for example from U.S. Pat. No. 4,434,010.

Said substrate surface preferably carries indicia, produced by printing, but any other technique able to produce indicia, such as laser marking, may be used as well. Preferably, said substrate surface is marked with indicia using a method chosen from: intaglio printing, letterpress printing, offset printing, screen printing, gravure/flexographic printing, laser printing, laser marking, dye sublimation and ink-jet printing.

Formulations of general printing inks which are suitable for the printing of value documents have been disclosed, e.g. in EP-A-0 088 466; EP-A-0 119 958; EP-A-0 327 788; EP-A-0 340 163; EP-A-0 432 093 and elsewhere. These inks can serve for the imprinting of said substrate surface prior to the production of the security element of the present invention.

The printed elements on said substrate surface can be light-absorbing, light-reflecting or luminescent in nature, or a combination thereof, and can be produced by applying spectrally selective absorbing inks, spectrally selective reflecting inks, spectrally selective luminescent inks, etc.

All elements described above can be combined with additional security elements, which can be i) material-based, such as, e.g. a material presenting particular spectral absorption or emission, ii) information-based, such as a particular code or number embodied on the document, or iii) tied to a particular process of production, such as, e.g. intaglio printing, as known to the skilled in the art.

In a further embodiment, it is also possible to separately prepare the security element according to the present invention, in the form of a foil, a thread, a decal or a label, which is subsequently applied to or incorporated in a document of value, according to methods known to the skilled in the art.

The invention discloses further a method of producing the above-described security element, said method comprising the steps of a) providing a substrate having a surface, which surface contains indicia or other visible features;
b) applying, on top of at least part of said substrate surface, a coating layer comprising orientable flake pigment particles and a curable, transparent binder;
c) locally orienting said flake pigment particles in said coating layer, such as to give visibility to said underlying indicia or other visible features along at least one specific direction of observation and to impede visibility to said underlying indicia or other visible features along at least another direction of observation, wherein the orientation of the pigment flakes in said coating layer does not itself comprise or reflect said underlying indicia or other visible features;
d) curing said coating layer, so as to fix the orientation of the said flake pigment particles;

wherein the said flake pigment particles are absorbing in at least part of the visible spectrum.

Said substrate surface on said document, said coating layer comprising a flake pigment, and said flake pigment are herein chosen as described above. Said coating layer comprising said flake pigment is furthermore preferably applied by a method chosen from screen printing, gravure/flexographic printing, or roller coating.

Said flake pigment comprised in said layer is preferably a magnetic pigment, and said locally orienting of said flake pigment is preferably performed by applying a magnetic field, which, in turn, can be generated either by electromagnetic or by permanent magnetic devices, as described in U.S. Pat. Nos. 3,676,273; 3,791,864; EP-B-0406 667; EP-B-0556 449; EP-A-0 710 508 and WO 02/90002, as well as in the co-pending application PCT/EP2004/007028, the respective content thereof being incorporated by reference.

Said coating layer comprising said flake pigments may furthermore comprise additional security elements such as visible luminescent compounds, infrared luminescent compounds, infrared absorbing compounds, and magnetic substances, which however do not provide for the same indicia/features which are present in or on the surface of said substrate.

The invention is hereafter further explained with reference to exemplary and non-limiting figures and embodiments.

FIG. 1A-G schematically show cross sections through different embodiments of the security element according to the present invention.

FIG. 2 shows an embodiment of the invention having a single oblique orientation of the "Venetian Blind" overprint, similar to the schemes shown in FIGS. 1A and 1B. The underlying indicia are visible at grazing view (FIG. 2B), but not at orthogonal view (FIG. 2A).

FIG. 3 shows an embodiment of the invention having two different orientations of the "Venetian Blind" overprint, similar to the scheme shown in FIG. 1C. A first (right) part of the underlying indicia is visible when tilting the sample to the left (FIG. 3A); a second (left) part of the underlying indicia is visible when tilting the sample to the right (FIG. 3C); none of the underlying indicia are visible at orthogonal view (FIG. 3B).

FIG. 4 shows an embodiment of the invention which is similar to the embodiment of FIG. 3, but inverted left-to-right, according to the scheme shown in FIG. 1D: now, a first (left) part of the underlying indicia is visible when tilting the sample to the left (FIG. 4A); a second (right) part of the underlying indicia is visible when tilting the sample to the right (FIG. 4C); none of the underlying indicia are visible at orthogonal view (FIG. 4B).

General printing ink formulations for the printing of value documents, which can serve for the imprinting of said substrate surface underneath the "Venetian Blind" coating, have been disclosed in the prior art, e.g. in EP-B-0 088 466; EP-B-0 119 958; EP-B-0327 788; EP-B-0340 163; EP-B-0432 093, the respective content thereof being incorporated by reference.

Suitable inks for the printing of the "Venetian Blind" coating layer comprising magnetically or otherwise orientable flake pigment particles are preferably chosen from the group of liquid inks, such as screen-printing and gravure printing/flexographic inks. Exemplary ink formulas are given in the following. Unless otherwise indicated, percentages are by weight.

EXAMPLE 1

An OVI® Flexography Ink Comprising a Magnetic Optically Variable Pigment

| | |
|---|---|
| Neocryl BT-105 (Avecia) | 45% |
| Deionised water | 19% |
| Dowanol DPM (Dow) | 6.5% |
| AMP-95 ™ (Angus Chemie GmbH) | 1.5% |
| Neocryl BT-100 | 7% |
| Tego Foamex 800 (Tego Chemie Service GmbH) | 0.5% |
| Aerosil 200 (Degussa) | 0.5% |
| Magnetic Optically Variable Pigment (FLEX Prod. Inc.)* | 20% |

green-to-blue, 5 layers design, $Cr/MgF_2/Ni/MgF_2/Cr$ as disclosed in U.S. Pat. No. 4,838,648.

The ingredients were dispersed together and the viscosity of the resulting mixture was adjusted with deionised water, so as to reach the value of 20-40 s DIN4 at 25° C.

The ink was applied through flexographic printing onto a substrate (banknote paper), carrying a laser-printed black pattern (consisting of indicia "10") on its surface, and the so imprinted substrate was exposed, while still wet, to a uniform magnetic field, hereby orienting the magnetic pigment particles along the field lines in a 45° oblique direction with respect to the substrate surface. The ink was then dried in situ using a flow of hot air.

Figure 1A:
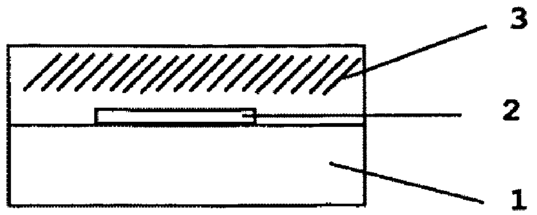
Figure 1B:
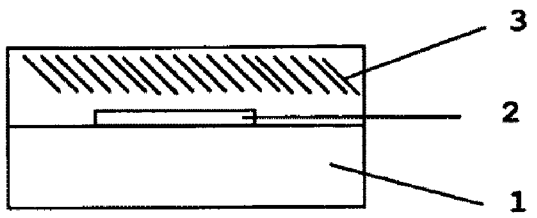
Figure 1C:
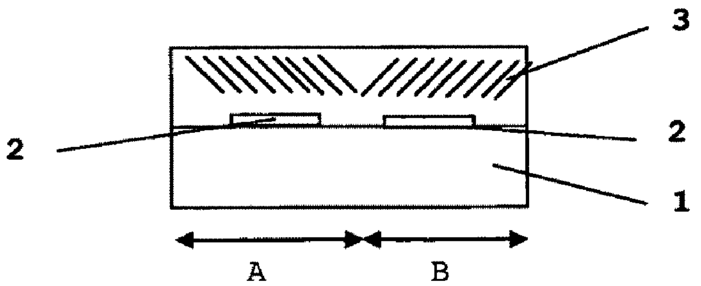
Figure 1D:
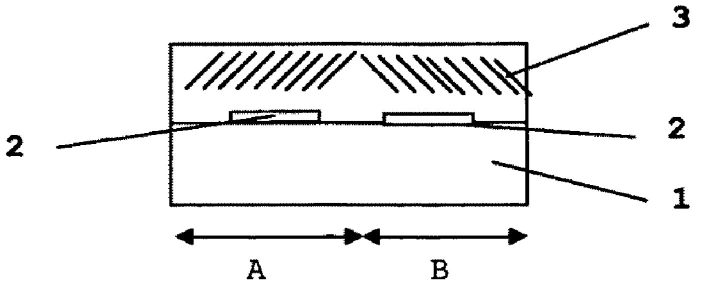
Figure 1E:
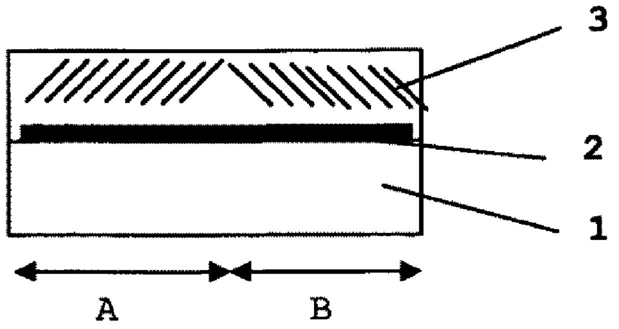
Figure 1F:
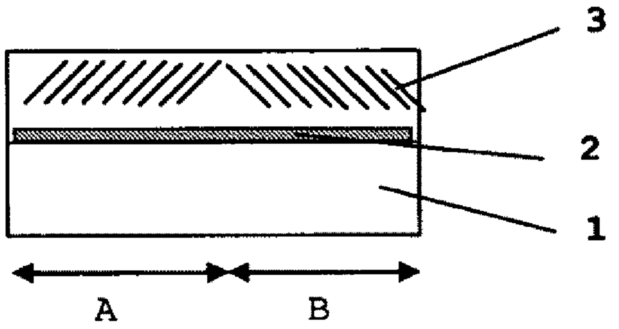
Figure 1G:
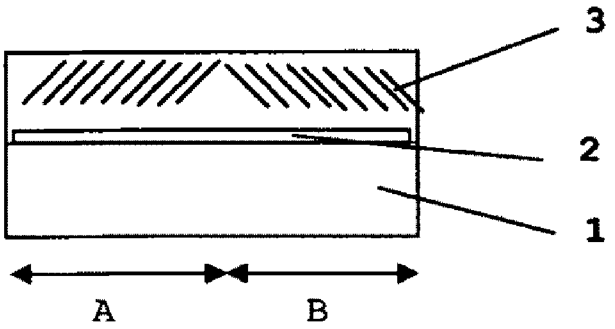
Figure 2A:
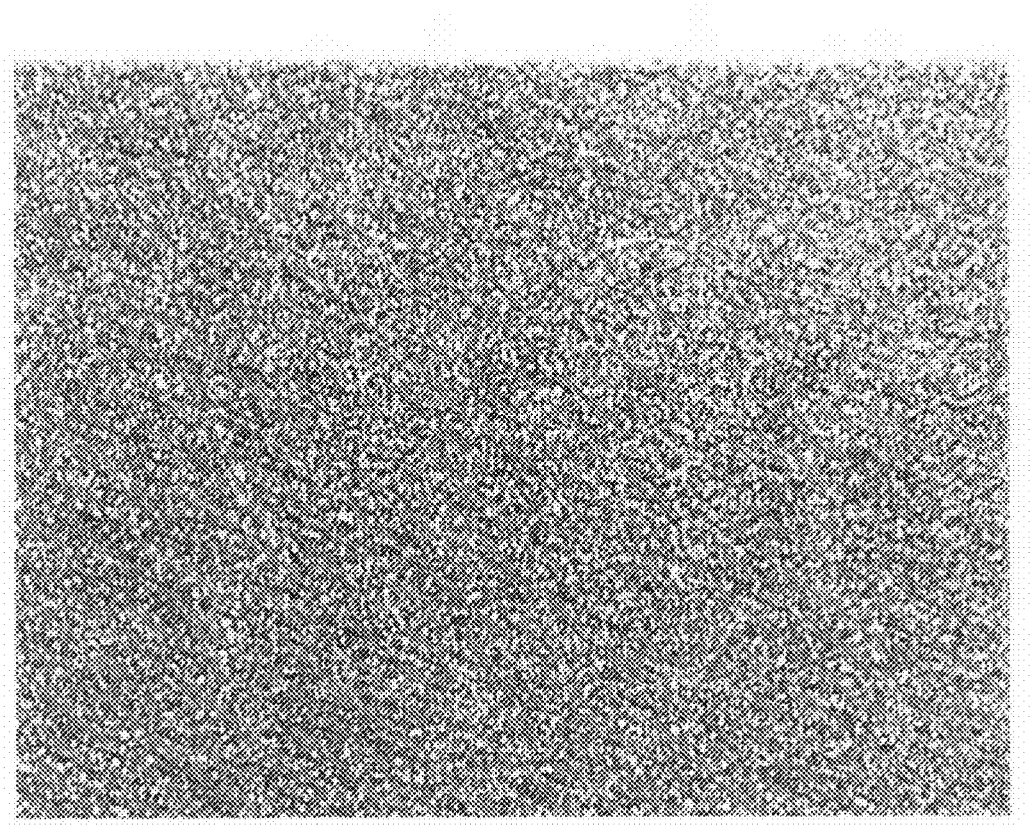
Figure 2B:
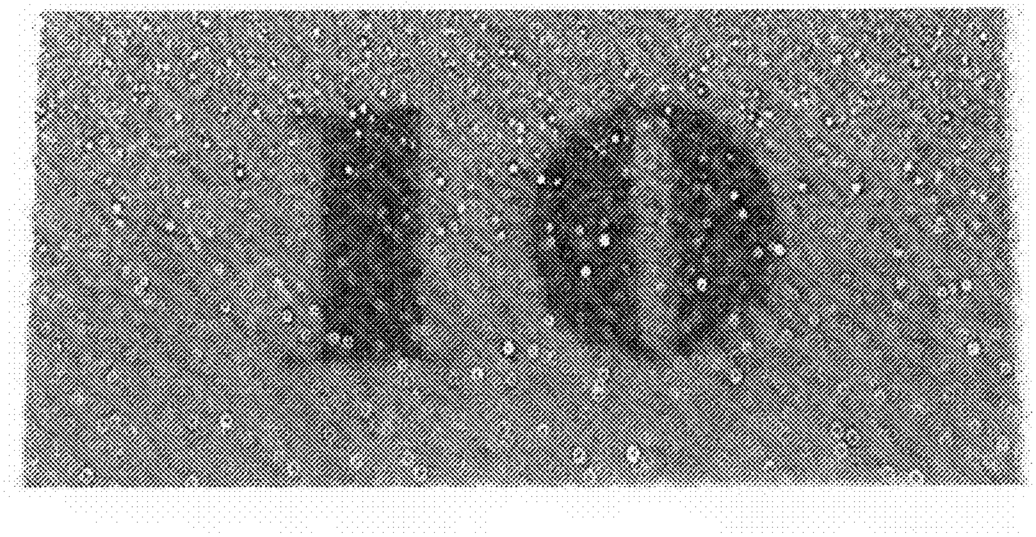
Figure 6A:
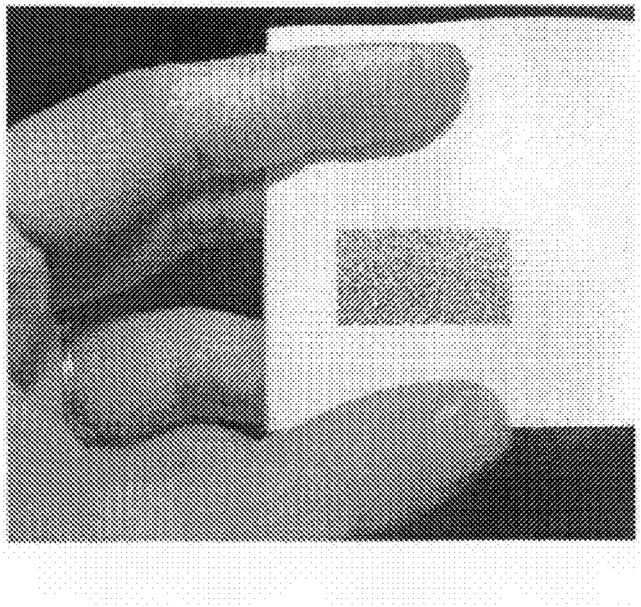
FIG. 6 shows the visual authentication of an embodiment of the security element of the present invention by a simple tilting of the document carrying it.
Figure 6B:
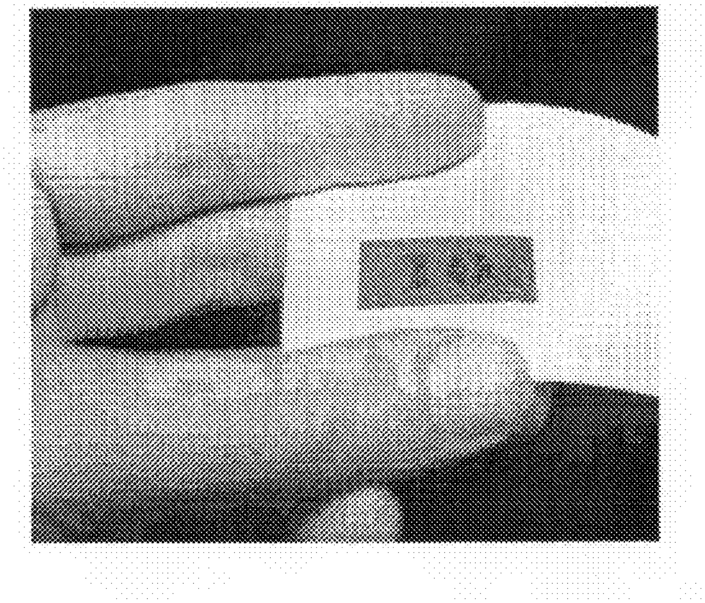

As shown in FIG. 2 and FIG. 6, under illumination conditions where a light source was located above the observer, the printed area appeared uniformly green when the print was observed orthogonally to the substrate plane; (FIGS. 2A, 6A). When the print was tilted backwards (grazing view; FIGS. 2B, 6B), the underlying black indicia, "10", became visible. The security element according to the present embodiment provided excellent copy protection for sensible information, due to the inability of scanning devices to read at grazing angle.

EXAMPLE 2

An OVI® Silkscreen Ink, Comprising a Magnetic Optically Variable Pigment

| | |
|---|---|
| Diethyl ketone | 23% |
| Ethyl diglycol | 29% |
| Solution Vinyl VMCA (Union Carbide) | 27% |
| BYK-053 (BYK) additive | 1% |
| Magnetic Optically Variable Pigment (FLEX Prod. Inc.)* | 20% |

magenta-to-green, 7 layers design as disclosed in WO 02/73250: $Cr/MgF_2/Al/Ni/Al/MgF_2/Cr$.

The vinyl resin was dissolved in the ketone-glycol solvent prior to the incorporation of the additive and the pigment. The viscosity was adjusted using the same solvent blend so as to reach the value of 600 to 1,500 mPa·s at 25° C.

The ink was applied in the form of a screen-printed patch onto a substrate carrying a printed pattern (ink-jet printed colored dots), and the so imprinted substrate was subjected, while still wet, to a structured magnetic field, hereby locally orienting the magnetic pigment particles in two opposed 45° oblique directions with respect to the substrate surface. The ink was then dried in situ using a flow of hot air.

Figure 3A:
Figure 3B:
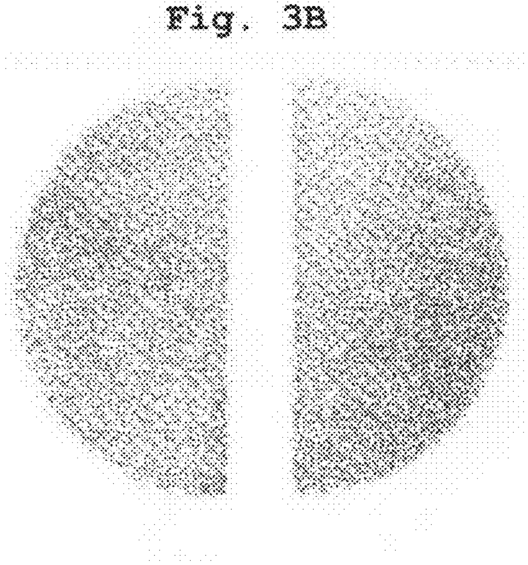
Figure 3C:
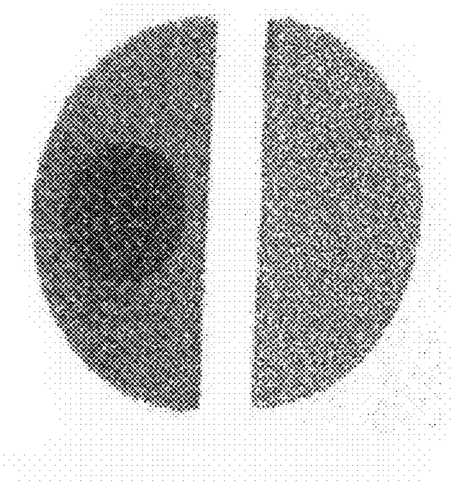

In the exemplary embodiment shown in FIG. 3, corresponding to Scheme 1C above, the substrate surface element printed to the right was revealed by tilting the print to the left so as to observe it from the right (FIG. 3A). Conversely, the substrate surface element printed on the left was revealed by tilting the print to the right so as to observe it from the left (FIG. 3C). When the print was observed orthogonally to the substrate plane, the elements of the substrate surface were hidden altogether (FIG. 3B).

Figure 4A:
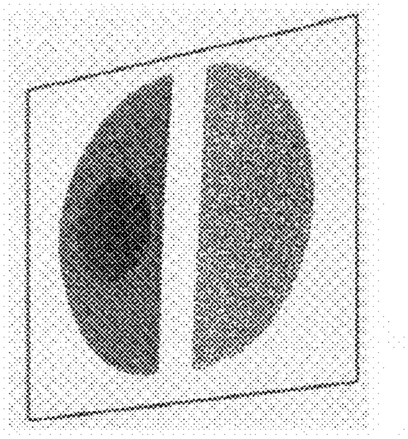
Figure 4B:
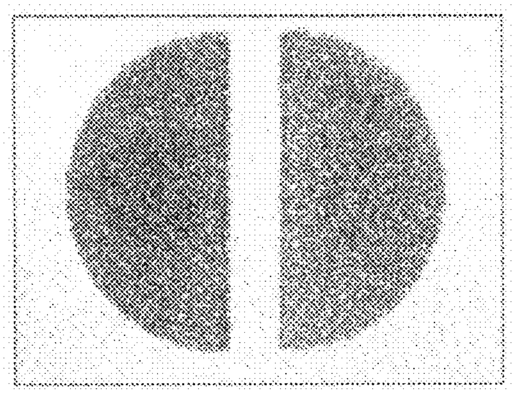
Figure 4C:
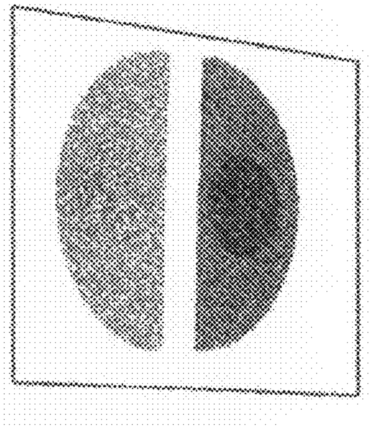

In the exemplary embodiment shown in FIG. 4, corresponding to Scheme 1D above, the substrate surface element printed on the left was revealed by tilting the print to the left so as to observe it from the right (FIG. 4A). Conversely, the substrate surface element printed on the right was revealed by tilting the print to the right so as to observe it from the left (FIG. 4C). When the print was observed orthogonally to the substrate plane, the elements of the substrate surface were hidden altogether (FIG. 4B).

Figure 5A:
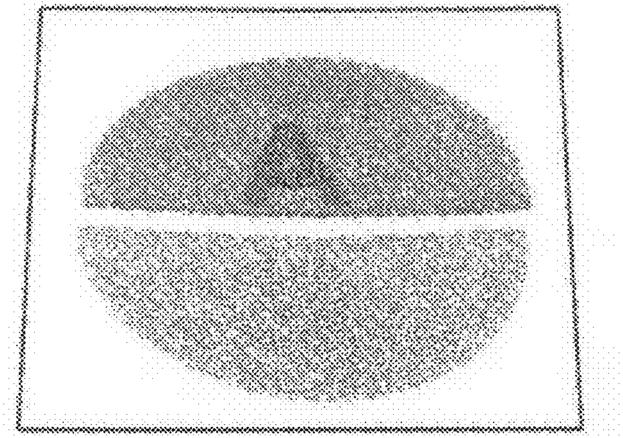
FIG. 5 shows an embodiment of the invention which is similar to the embodiment of FIGS. 3 and 4, but now with two different orientations of the "Venetian Blind" overprint in up-down direction.
Figure 5B:
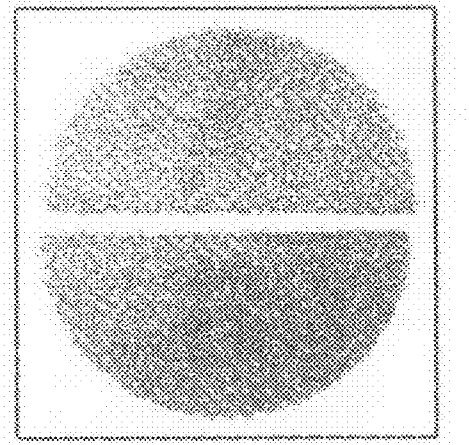
Figure 5C:
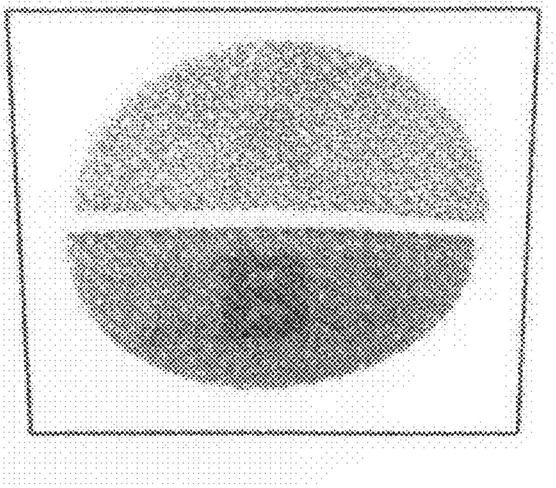

In the exemplary embodiment shown in FIG. 5, two opposed 450 oblique directions of the "Venetian Blind" were vertically arranged on top of a substrate carrying the vertically arranged letters "A" and "B" on its surface. The indicia printed on the upper part, i.e. the letter "A", were revealed by tilting the print backwards, as depicted in FIG. 5A. Conversely, the indicia printed on the lower part, i.e. the letter "B", were revealed by tilting the print forward, as depicted in FIG. 5C. When the print was observed orthogonally to the substrate plane, neither "A" nor "B", printed on the substrate surface, were visible, as shown in FIG. 5B.

The indicated embodiments were also realized on the base of other flake pigments and using different ink chemistries, as disclosed in the following:

EXAMPLE 3

A UV Drying Screen Ink

| | |
|---|---|
| Epoxyacrylate oligomer | 40% |
| Trimethylolpropane triacrylate monomer | 15% |
| Tripropyleneglycol diacrylate monomer | 15% |
| Genorad 16 (Rahn) | 1% |
| Colored magnetic pigment ($SiO_2$-coated iron particles) (BASF) | 20% |
| Aerosil 200 (Degussa-Huels) | 1% |
| Irgacure 500 (CIBA) | 6% |
| Genocure EPD (Rahn) | 2% |

The ink was applied in the form of a screen-printed patch onto a substrate carrying indicia. After orientation of the magnetic pigment particles, the ink was dried in situ using a UV-radiation curing unit.

EXAMPLE 4

A Coercive Magnetic Gravure Ink

| | |
|---|---|
| Ethanol | 25% |
| Ethyl acetate | 25% |
| Dicyclohexylphtalate (Unimoll 66, Bayer) | 5% |
| Fumaric acid modified rosin (ERKAMAR 3270, Robert Kraemer GmbH & Co) | 5% |
| Polyvinylbutyral resin (Pioloform BN18, Wacker-Chemie GmbH) | 13% |
| Magnetic pigment 345 (BASF) | 5% |
| HELICONE ® HC MAPLE S (Wacker Chemie GmbH) | 10% |
| Ethanol | 4% |
| Ethyl acetate | 8% |

The resins were dissolved in the solvents prior to the incorporation of the pigments. The viscosity was adjusted with solvent blend to reach the value of 20-40 s DIN4 at 25° C. The ink was applied to a substrate carrying indicia, by the means of a gravure printing process. After orientation of the pigment particles with the help of a magnetic field, the ink was dried in situ using a flow of hot air.

The given examples illustrate how, by the means of the Venetian Blind Effect, the direction of visibility of a substrate surface, carrying indicia or other features, can be freely defined, by giving a corresponding orientation to flake pigment particles contained in a transparent coating which is applied over said substrate surface. Based on the given description and the examples, the skilled man will be able to derive further embodiments of the disclosed invention.

The invention claimed is:

1. A security element for a document of value, right, or or identity, for a security label or for a good, said security element comprising a substrate, which contains indicia in or on a surface of the substrate, and on at least part of the said surface of the substrate, a coating layer comprising pigment flakes in a cured, transparent binder, wherein said pigment flakes in said coating layer are absorbing in at least part of the visible spectrum, and are locally oriented such as to give visibility to the underlying indicia along at least one specific direction of observation and the underlying indicia cannot be seen along at least another direction of observation, and wherein the orientation of the pigment flakes in said cured, transparent binder does not itself comprise or reflect said indicia which are present in or on the surface of said substrate, and wherein said pigment flakes are optically variable pigment flakes having magnetic properties which can be oriented by magnetic means, and wherein said cured, transparent binder is formed from a UV- or electron beam curing ink.

2. The security element according to claim 1, wherein said substrate is selected from the group consisting of transparent substrates carrying printed, coated, or laser-marked indicia, and opaque substrates carrying printed, coated, or laser-marked indicia.

3. The security element according to claim 1, wherein said coating layer and/or said substrate comprises a marker substance selected from the group consisting of a visible luminescent substance, an infrared luminescent substance, an infrared absorbing substance, and a magnetic substance.

4. The security element according to claim 1, wherein said substrate carries an optical interference device.

5. The security element according to claim 1, wherein said flakes are selected from the group consisting of thin-film interference pigments and liquid crystal polymer pigments.

6. The security element according to claim 1, wherein the concentration of said pigment flakes is in the range of 10% to 30% by weight of the coating layer.

7. The security element according to claim 1, wherein the pigment flakes have a flake average diameter in the range of 10 to 50 micrometers.

8. A method of producing a security element according to claim 1, comprising a) providing the substrate having the surface, which surface contains indicia;

b) applying, on top of at least part of the said surface of the substrate, a coating layer comprising the pigment flakes, which are orientable, and a curable, transparent binder;

c) locally orienting said pigment flakes in said coating layer, such as to give visibility to the underlying indicia along at least one specific direction of observation, and to impede visibility to the underlying indicia along at least another direction of observation, wherein the orientation of the pigment flakes in said coating layer does not itself comprise or reflect said underlying indicia;

d) curing said coating layer, so as to fix the orientation of the said pigment flakes;

wherein the said pigment flakes are absorbing in at least part of the visible spectrum, and wherein said pigment flakes are optically variable pigment flakes having magnetic properties wherein said local orientation of said pigment flakes is achieved by applying a magnetic field, and wherein said curable, transparent binder is a UV- or electron beam curing ink.

9. The method according to claim 8, wherein said coating layer comprising said pigment flakes is applied by a method selected from the group consisting of screen printing, gravure/flexographic printing, and roller coating.

10. The method according to claim 8, wherein said indicia are applied onto said surface of the substrate by a method selected from the group consisting of intaglio printing, letterpress printing, offset printing, screen printing, gravure/flexographic printing, laser printing, laser marking, dye sublimation, and ink-jet printing.

11. Document of value, right, identity, security label, or good, comprising the security element according to claim 1.

12. A method of authentication for the prevention of counterfeiting or reproduction, comprising a) providing a document of value, right, or identity, a security label or a good, having the security element according to claim 1, and b) observing the angle-dependent appearance/disappearance of indicia underlying the coating layer of the security element.

* * * * *

UNITED STATES PATENT AND TRADEMARK OFFICE

CERTIFICATE OF CORRECTION

PATENT NO. : 8,211,531 B2
APPLICATION NO. : 11/721078
DATED : July 3, 2012
INVENTOR(S) : M. Schmid et al.

It is certified that error appears in the above-identified patent and that said Letters Patent is hereby corrected as shown below:

In Column 11, Line 59 (Claim 1, Line 1), “or or” should be ---or---.

Signed and Sealed this
Nineteenth Day of February, 2013

Teresa Stanek Rea
*Acting Director of the United States Patent and Trademark Office*

UNITED STATES PATENT AND TRADEMARK OFFICE

CERTIFICATE OF CORRECTION

PATENT NO. : 8,211,531 B2
APPLICATION NO. : 11/721078
DATED : July 3, 2012
INVENTOR(S) : Schmid et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1339 days.

Signed and Sealed this
Sixteenth Day of July, 2013

Teresa Stanek Rea
*Acting Director of the United States Patent and Trademark Office*